May 14, 1963
J. C. BOLLIER
3,089,348
TRANSMISSION
Filed Oct. 12, 1959
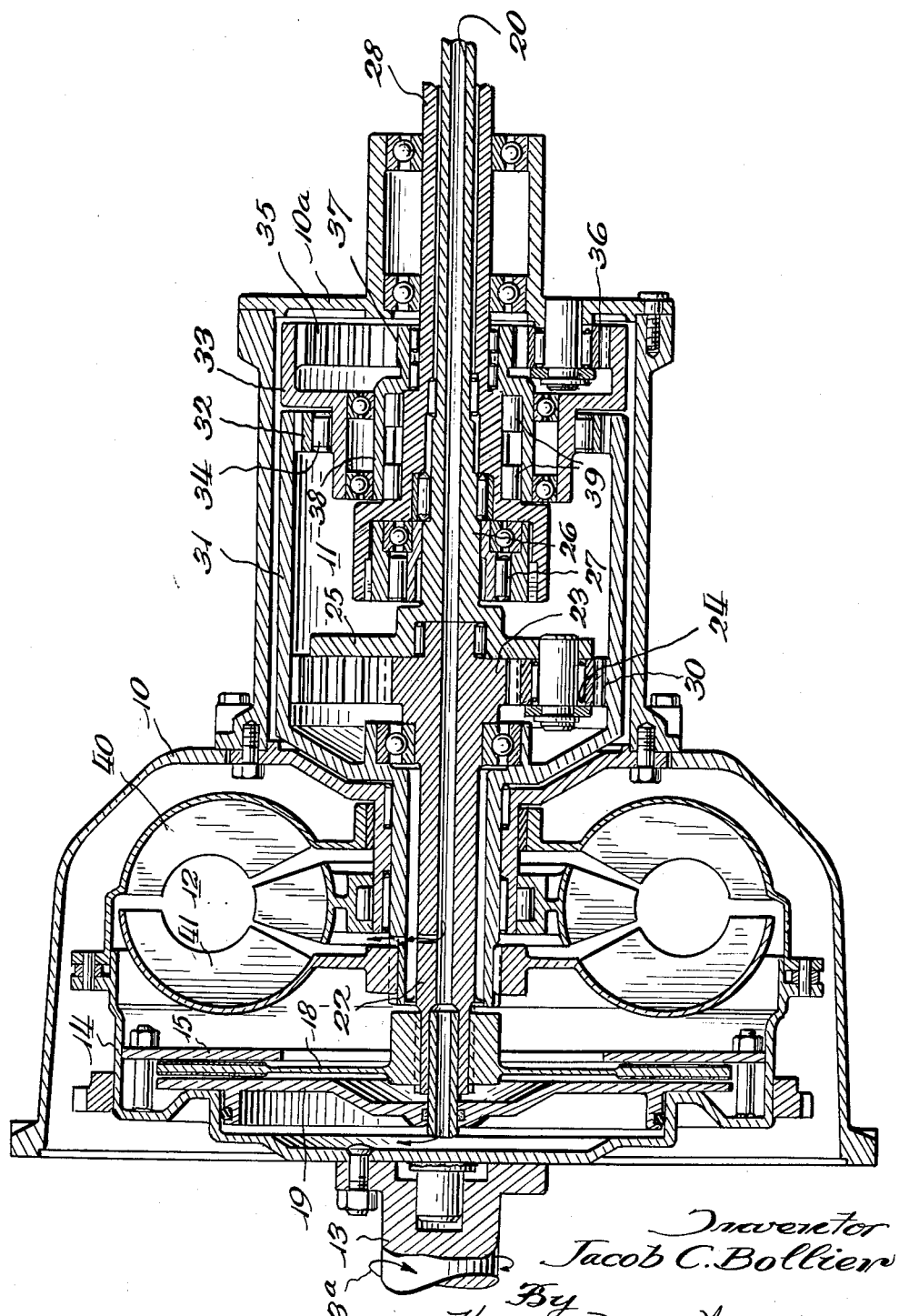
Inventor
Jacob C. Bollier
By
Hofgren, Brady, Wegner,
Allen & Stellman
Attorneys

United States Patent Office 3,089,348
Patented May 14, 1963

3,089,348
TRANSMISSION
Jacob C. Bollier, 1925 W. Barker Ave., Peoria, Ill.
Filed Oct. 12, 1959, Ser. No. 845,949
8 Claims. (Cl. 74—688)

This invention relates to a transmission and more particularly to a mechanical, variable speed drive.

The mechanical transmission disclosed herein provides automatically and continuously variable torque and speed from a drive element to a driven element, dependent on the requirements of the load connected with the driven element and within the capabilities of the drive source.

One feature of the invention is the provision in a transmission having drive and driven elements of two mechanical interconnections between them, preferably with different drive ratios and arranged so that the power delivered to the driven element is transmitted in the proper ratio through the two connections, resulting in the provision of continuously variable torque and speed to the driven element.

Another feature is that the drive and driven elements are interconnected through a planetary gear system having at least three elements, one of which is connected with the drive element and the other two of which are connected with the driven element, and more specifically the drive element is connected with the sun gear of the planetary system while two drive connections with the driven element include the planet carrier and ring gear. The torque requirements of the load cause a reaction through the mechanical interconnections which determines the path through which power is delivered.

Still another feature is the inclusion in the transmission of a hydraulic torque converter connected between the drive element and one of the mechanical interconnections to the driven element, through which a retarding force may be applied to the ring gear of the planetary system.

Further features and advantages of the invention will readily be apparent from the following specification and from the drawing, which is a sectional view partially diagrammatic in form, through a transmission embodying the invention.

Variable speed mechanical transmissions, as distinguished from fluid transmissions, require the shifting of gears, either physically or through the adjustment of brakes or the like associated with various elements of the system and controlled either manually by the operator or through speed sensing devices, and do not provide energy to a load with smooth, continuously variable torque and speed. These objections are overcome by the transmission of this invention.

Turning now to the drawing a housing 10 encloses a mechanical transmission 11 and an auxiliary hydraulic torque convertor 12. A drive element or shaft 13 is connected with a suitable prime mover as an internal combustion engine (not shown) and rotates in the direction shown by arrow 13a which will be considered the clockwise direction for the purposes of the discussion herein. Drive shaft 13 is connected directly with the inner housing member 14 forming a part of hydraulic torque convertor 12 which has secured to it a thrust plate 15. A hydraulically actuated friction clutch arrangement includes a driven plate 18 and a clutch piston 19 movable axially of the transmission under the influence of the pressure of hydraulic fluid introduced through the bore 20 extending through several of the elements of the system. Driven plate 18 is secured on an extension 22 of the hub of sun gear 23, part of a planetary gear system. Planet gear 24 is rotatably mounted on a carrier 25 which has an axial extension 26 engageable through a one-way mechanical drive 27 with the driven element or shaft 28 providing a first mechanical interconnection between the drive shaft 13 and driven shaft 28. One-way mechanism 27 permits the transfer of power from carrier extension 26 to driven shaft 28 only in the clockwise direction, and the carrier turns freely if its rotation is counterclockwise relative to the rotation of the driven shaft.

Ring gear 30 of the planetary gear system forms a portion of the second mechanical interconnection between drive shaft 13 and driven shaft 28. Ring gear 30 is on the inner surface of a sleeve 31 which has a splined driving connection 32 at one end thereof with a one-way mechanical drive 34 which transmits power to an auxiliary member 33 when the sleeve 31 rotates in a counterclockwise direction, as will appear. A ring gear 35 is formed on the inner surface of auxiliary drive member 33 and engages a pinion 36 rotatably mounted on end member 10a of the transmission housing and the pinion in turn engages a central gear 37 which has an extension portion 38 connected with driven shaft 28 through a pair of one-way drive mechanisms 39 arranged to transmit power to driven element 28 in the clockwise direction of rotation.

The operation of the transmission in delivering power from drive shaft 13 to driven shaft 28 through a continuous range of speeds and torque will now be considered. When clutch piston 19 is actuated sun gear extension 22 is connected with and rotated by drive shaft 13. The rotation of sun gear 23 has a tendency to rotate the entire planetary system. However, the load connected with driven shaft 28 requires a certain amount of torque to overcome its inertia and friction, causing a reaction transmitted through one-way drive mechanism 27 to the planet carrier 25. Considering first the situation where the torque required to turn driven shaft 28 is greater than that available with a direct drive connection, planet carrier 25 will remain stationary and the rotation of sun gear 23 will cause rotation of planet gears 24, turning ring gear 30 and sleeve 31 in a counterclockwise direction. This rotation is transmitted through one-way drive mechanism 34 to auxiliary element 33 and through ring gear 35, idler pinion 36 and central gear 37 to one-way drive mechanisms 39 and driven shaft 28. The drive ratio of the gearing in this second interconnection between the drive and driven shafts is such that the torque delivered to the driven shaft through this connection is greater than that delivered directly through the planetary gear system and turns the shaft at a slower speed. As the driven shaft 28 begins to turn, planet carrier 25 also turns, and a portion of the torque required for the load is supplied directly from the sun gear to the planet carrier and through one-way drive mechanism 27 to the driven element. As the load speed increases and the torque requirement decreases the speed of rotation of planet carrier 25 increases and the counterrotation of sleeve 31 decreases. The torque of the power supplied to the load depends upon resistance encountered and is coupled to the load through two parallel mechanical connections, with the division between the connections being made automatically by the nature of the operation of the planet system.

At a point in the acceleration of the system sleeve 31 comes to a standstill and then reverses in direction. With the sleeve 31 at a standstill, an intermediate speed and torque ratio is provided.

As the speed of rotation of the transmission increases further, the direction of rotation of sleeve 31 and ring gear 30 reverse and begin to increase in the clockwise direction. When the ring gear speed reaches that of sun gear 23, the entire planetary set rotates as a single element and power is delivered directly from drive shaft 13 to driven shaft 28 in a one-to-one ratio of speed and torque.

An auxiliary power delivery and control arrangement is provided by the hydraulic torque convertor 12. Impeller blades 40 are connected with rotating convertor housing 14, while turbine blades 41 are connected with an extension of sleeve 31. The interior of torque convertor is connected through suitable passageways with hydraulic fluid control passageway 20 so that the pressure on the fluid in the torque convertor itself may be varied by an external control (not shown).

Returning now to the previously described sequence of operation of the transmission, it will be recalled that with a load requiring a high degree of torque, sleeve element 31 initially rotates in a direction opposite the direction of rotaton of drive shaft 13. Thus, turbine blades 41 rotate in a direction opposite the direction of rotation of impeller 40. This counterrotation of torque convertor elements impedes the counter-rotation of sleeve 31 and, at least in the initial stages of operation, may be minimized by reducing the pressure on the hydraulic fluid in the torque convertor. As the load speed increases, the tendency of sleeve 31 to slow down and reverse its direction of rotation may be increased by increasing either the speed of the prime mover connected with drive shaft 13 or the pressure of the hydraulic fluid in the system. After the turbine blades have reversed their direction of rotation, so that sleeve 31 rotates in the same direction as sun gear 23, the power from drive shaft 13 is coupled to the driven shaft 28 through two parallel paths, one through the clutch mechanism and sun gear 23 and the other through the torque convertor and ring gear 30.

In summary, the mechanical transmission 11 provides for delivery of power from a drive shaft to a driven shaft through a continuous range of torque and speed, within the capabilities of the prime mover and without manual or automatic shifting of gears or brake bands. Torque convertor 12 provides an auxiliary drive arrangement, the characteristics of which may be varied as desired through control of the pressure of the hydraulic fluid.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a continuously variable mechanical transmission: a drive element; a driven element; a planetary gear system having a sun gear, a planet gear mounted on a carrier and a ring gear, the planet gear being in mesh with the sun and ring gears; means operatively connecting said sun gear with said drive element; first interconnecting means operatively connecting said carrier mechanically with said driven element and including a first one-way clutch mechanism; and second interconnecting means, operable simultaneously and in parallel with said first interconnecting means, operatively connecting said ring gear mechanically with said driven element, including a second one-way clutch mechanism, a second ring gear connected with the first-mentioned ring gear through said second one-way clutch mechanism, fixedly mounted pinions and a central gear connected with said driven element and through said pinions with said second ring gear.

2. In a continuously variable mechanical transmission: a drive element; a driven element; a planetary gear system having a sun gear, a planet gear mounted on a carrier and a ring gear, the planet gear being in mesh with the sun and ring gears; means operatively connecting said sun gear with said drive element; first interconnecting means operatively connecting said carrier mechanically with said driven element and including a first one-way clutch mechanism; and second interconnecting means, operable simultaneously and in parallel with said first interconnecting means, operatively connecting said ring gear mechanically with said driven element, including a second one-way clutch mechanism connected with said ring gear and further gear means connected between said second one-way clutch mechanism and said driven element.

3. In a continuously variable mechanical transmission: a drive element; a driven element; a planetary gear system having a sun gear, a planet gear mounted on a carrier and a ring gear, the planet gear being in mesh with the sun and ring gears; means operatively connecting said sun gear with said drive element; first interconnecting means operatively connecting said carrier mechanically with said driven element; and second interconnecting means, operable simultaneously and in parallel with said first interconnecting means, operatively connecting said ring gear mechanically with said driven element, including further gear means having one gear element connected with said ring gear and another gear element operatively connected with said one gear element and connected with said driven element.

4. The transmission of claim 3 wherein a fluid coupling is operatively connected between said drive element and one of said interconnecting means.

5. The transmission of claim 1 wherein a fluid coupling is operatively connected between said drive element and the ring gear of said planetary gear system.

6. The transmission of claim 3 wherein said first and second interconnecting means have different drive ratios.

7. In a continuously variable mechanical transmission: a drive element; a driven element; a planetary gear system having a sun gear, a planet gear mounted on a carrier and a ring gear, the planet gear being in mesh with the sun and ring gears; means operatively connecting said sun gear with said drive element; first interconnecting means operatively connecting said carrier mechanically with said driven element and including a first one-way clutch mechanism; and second interconnecting means, operable simultaneously and in parallel with said first interconnecting means, operatively connecting said ring gear mechanically with said driven element, including a second one-way clutch mechanism, a second ring gear connected with the first-mentioned ring gear through said second one-way clutch mechanism, fixedly mounted pinions and a central gear connected with said driven element and through said pinions with said second ring gear, said second interconnecting means providing a drive path from the drive element to the driven element with a drive ratio different from the drive ratio of the drive path provided by said first interconnecting means, delivering high torque to the driven member at low speeds.

8. In a continuously variable mechanical transmission: a drive element; a driven element; a planetary gear system having a sun gear, a planet gear mounted on a carrier and a ring gear, the planet gear being in mesh with the sun and ring gears; means operatively connecting one of said gears with said drive element; first interconnecting means operatively connecting another of said gears mechanically with said driven element and including a first one-way clutch mechanism; and second interconnecting means, operable simultaneously and in parallel with said first interconnecting means, operatively connecting the third of said gears mechanically with said driven element and including a second one-way clutch mechanism, said first and second interconnection means having different drive ratios, delivering torque to said driven element in different proportions at different speeds.

References Cited in the file of this patent
UNITED STATES PATENTS

| | | |
|---|---|---|
| 1,923,995 | Nock | Aug. 22, 1933 |
| 2,383,980 | Lysholm | Sept. 4, 1945 |
| 2,693,721 | Forster | Nov. 9, 1954 |
| 2,728,247 | Synder | Dec. 27, 1955 |
| 2,804,780 | Gerst | Sept. 3, 1957 |
| 2,933,936 | McClelland | Apr. 26, 1960 |

FOREIGN PATENTS

| | | |
|---|---|---|
| 191,267 | Austria | Aug. 10, 1957 |
| 399,155 | Great Britain | Sept. 19, 1933 |